United States Patent
Chan et al.

(10) Patent No.: US 8,381,007 B2
(45) Date of Patent: Feb. 19, 2013

(54) DATA STORAGE SYSTEM WITH POWER BACKUP MECHANISM

(75) Inventors: Sio-Pang Chan, Taipei (TW); Tsung-Hsi Lee, Taipei (TW)

(73) Assignee: Inventec Corporation, Taipei (TW)

( * ) Notice: Subject to any disclaimer, the term of this patent is extended or adjusted under 35 U.S.C. 154(b) by 305 days.

(21) Appl. No.: 12/846,852

(22) Filed: Jul. 30, 2010

(65) Prior Publication Data
US 2011/0273971 A1 Nov. 10, 2011

(30) Foreign Application Priority Data
May 5, 2010 (TW) ................................ 99114443 A

(51) Int. Cl.
*G06F 1/28* (2006.01)
(52) U.S. Cl. ............................ 713/340; 714/14; 714/22
(58) Field of Classification Search .................. 713/300, 713/340; 369/47.5; 714/14, 22
See application file for complete search history.

(56) References Cited

U.S. PATENT DOCUMENTS 7,627,774 B2* 12/2009 Egan et al. .................... 714/4.4
2010/0180131 A1* 7/2010 Liu .............................. 713/300

* cited by examiner

*Primary Examiner* — Glenn A Auve
(74) *Attorney, Agent, or Firm* — CKC & Partners Co., Ltd.

(57) ABSTRACT

A data storage system with power backup mechanism includes a storage server, N pieces of power supply modules, a plurality of programmable logic devices and a control module. The storage server consumes M units of power in operation, and supports a storage bridge bay standard. The power supply modules respectively generate power for the storage server and a set of power-related signals, wherein the maximum power output of each of the power supply modules is equal to $M/N-1$ units. The programmable logic devices convert the power-related signals from the power supply modules to two sets of power condition signals. The control module monitors a power condition according to the power condition signals, thereby determining a power health condition of the storage server.

10 Claims, 2 Drawing Sheets

DATA STORAGE SYSTEM WITH POWER BACKUP MECHANISM

RELATED APPLICATIONS

This application claims priority to Taiwan Application Serial Number 99114443, filed May 5, 2010, which is herein incorporated by reference.

BACKGROUND

1. Field of Invention

The present invention relates to a data storage system. More particularly, the present invention relates to a data storage system with power backup mechanism.

2. Description of Related Art

A data storage system in a server is very important component. The data storage system provides the server with large data storage capacity. However, to enable a stable data storage system to store a large amount of data, the power supply type is important. In general, the storage server supporting a storage bridge bay (SBB) standard only provides connections for two power supply modules. Therefore, if one of the power supply modules fails and cannot provide power, the rest of the power supply modules must have the capability to provide the power required for the operation of the whole data storage system to prevent the loss of data stored in the data storage system.

Under this architecture, if the power consumed by the data storage system is 3000 watts, the maximum power output of the power supply module must be 3000 watts too. When the two power supply modules work at full capacity, the total power that can be provided is 6000 watts, but since the data storage system only consumes 3000 watts of power, the remaining 3000 watts of power is not used. With respect to the cost, the design is a waste of money. In addition, a power supply module outputting greater power generates more thermal energy, and thus it is necessary to take more risks on the cost for heat dissipation of the data storage system.

Therefore, how to design a new data storage system with power backup mechanism used to improve the efficiency of the power supply module is an urgent problem need to be solved in this field.

SUMMARY

Therefore, an aspect of the present disclosure is to provide a data storage system with a power backup mechanism. The data storage system includes a storage server, N pieces of power supply modules, a plurality of programmable logic devices and a control module. The storage server consumes M units of power, wherein the storage server supports a storage bridge bay (SBB) standard. The power supply modules respectively generates power for the storage server and respectively generates a set of power-related signals, wherein the maximum power output of each of the power supply modules is equal to M/N−1 units, and N is a positive integer greater than 1. The programmable logic devices outputs two sets of power condition signals in accordance with the set of power-related signals of each of the power supply modules. The control module is used to monitor a power condition according to the two sets of power condition signals, thereby determining a power health condition of the storage server.

According to an embodiment of the present disclosure, the data storage system further includes a mid-plane to enable the programmable logic devices to communicate with the control module.

According to another embodiment of the present disclosure, the power supply modules provide M/N units of power respectively when in normal operation. When one of the power supply modules fails, the rest of the power supply modules provide M/N−1 units of power respectively. The control module determines that the power health condition of the data storage system is an insufficient power condition at which the data storage system has insufficient power, when at least two of the power supply modules fail.

According to further another embodiment of the present disclosure, the number of the programmable logic devices is equal to N.

According to further another embodiment of the present disclosure, the control module expresses the power condition in a two bits signal.

According to further another embodiment of the present disclosure, the two sets of power condition signals outputted by the programmable logic devices are outputted in the type of open-drain. The programmable logic devices receive all the sets of power-related signals of the power supply modules to generate the two sets of power condition signals.

The advantage of applying the present disclosure is described as follows. By setting up a plurality of power supply modules, the data storage system is applied with power backup mechanism and the consumed power of which can be evenly shared by the power supply modules, and the programmable logic devices convert the power-related signals supporting the storage bridge bay (SBB) standard, thereby easily achieving the foregoing objects.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
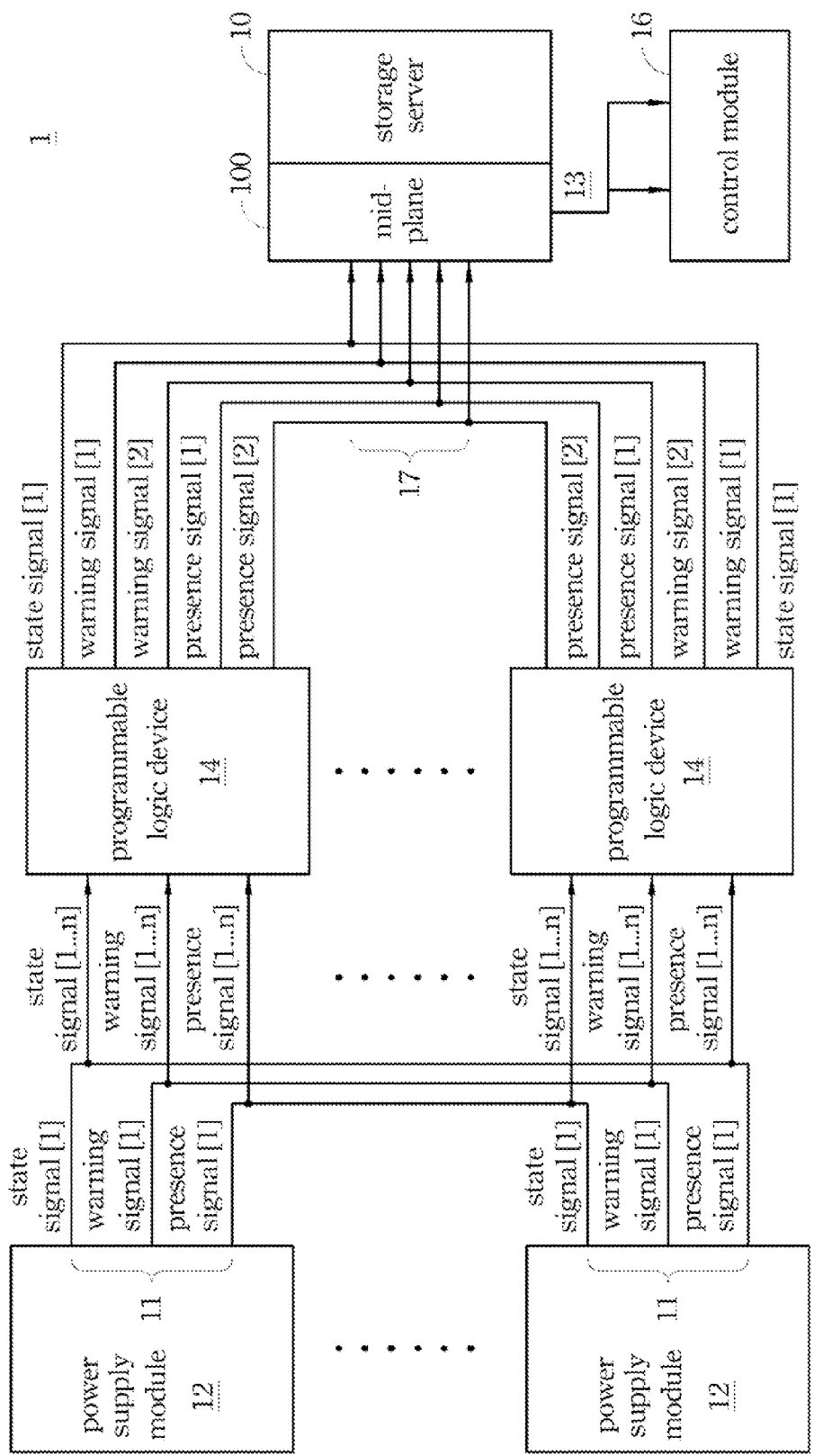
FIG. 1 is a block diagram showing a data storage system with power backup mechanism according to an embodiment of the present disclosure.

Referring to FIG. 1, FIG. 1 is a block diagram that shows a data storage system 1 with a power backup mechanism according to an embodiment of the present disclosure. The data storage system 1 includes a storage server 10, N pieces of power supply modules 12, a plurality of programmable logic devices 14 and a control module 16.

The storage server 10 consumes M units of power in operation and supports a storage bridge bay (SBB) standard. The storage server 10 supporting the SBB standard only provides connections for two power supply modules, so that the storage server 10 has many disadvantages with respect to the efficiency of providing power and the cost for heat dissipating.

The data storage system 1 has N pieces of power supply modules, wherein N is an integer greater than 1. The maximum power output of each of the power supply modules 12 is M/(N−1) units. Each of the power supply modules 12 generates power (not shown) for the storage server 10 and a set of power-related signals 11, wherein the power-related signals 11 includes a presence signal to determine whether there is power, a warning signal to alert of errors, a state signal used to determine if the power provided by the power supply modules 12 is in a normal state, etc. In other embodiments, the signals desired can be determined depending on actual demands.

The programmable logic device 14 converts the sets of power-related signals of all of the power supply modules 12 to two sets of power-related signals 17. In an embodiment, the programmable logic devices 14 may be complex programmable logic devices, and the number of which is equal to that of the power supply modules 12 (that is N). Each of the programmable logic devices 14 receives the power-related signals 11 generated by the power supply modules 12 to convert the power-related signals 11 to the power-related signals 17, as shown in FIG. 1. Because the data storage server 10 supporting SBB standard only provide connections for two power supply modules, the programmable logic device 14 converts the power-related signals 11 provided by the power supply modules 12 to two sets of power-related signals 17 by simulation to enable the power-related signals 11 to be complied with the standard. With respect to the control module 16, it still receives two sets of power-related signals complied with the SBB standard and believes there are only two power supply modules 12.

For example, in FIG. 1, the power-related signals provided by each of the power supply modules 12 include a state signal, a warning signal, and a presence signal. The power-related signals 11 provided by a first power supply module 12 are marked by "state signal [1]", "warning signal [1]", and "presence signal [1]", and the power-related signals 11 provided by an $n^{th}$ power supply module 12 are marked by "state signal [n]", "warning signal [n]", and "presence signal [n]". Each of the programmable logic devices 14 receives all the power-related signals 11 provided by all the power supply modules 12 (e.g., state signals [1 . . . n], warning signals [1 . . . n], and presence signals [1 . . . n]). After the programmable logic devices 14 collect and process the power related signals 11, each of the programmable logic devices 14 outputs two sets of power-related signals 17 and all the sets of power-related signals 17 are the same with each other. Because the state signals outputted by the programmable logic devices 17 are the same with each other, the two sets of the power-related signals 17 are commonly used and only one state signal is needed to be outputted therefrom, and the other signals therein are a warning signal 1, a presence signal 1, a warning signal 2, and a presence signal 2 outputted respectively therefrom.

In an embodiment, the programmable logic device 14 has open-drain type output terminals, and thus the two sets of power-related signals 17 are outputted in the type of open-drain.

In an embodiment, the control module 16 may include two control units (not shown), or set up by other ways. In the present embodiment, the storage server 10 includes a midplane 100 used to be a medium for the communication and data transmission between the programmable logic devices 14 and the control module 16, and if necessary, the mid-plane 100 can convert the power-related signals 17 to power condition signals 13. The control module 16 monitors a power condition of the power supply modules 12 in accordance with the two sets of power condition signals 13, thereby determining a power health condition of the storage server 10.

Therefore, when the power supply modules 12 are in normal operation, the power supply modules 12 respectively provide M/N units of power, thereby providing power of which the total amount is equal to M units to the storage server 10. When one of the power supply modules 12 fails, the rest of the power supply modules provide M/(N−1) units of power respectively to provide power of which the total amount is equal to M units to the storage server 10. When at least two of the power supply modules 12 fail, the control module 16 determines that the power health condition of the storage system 10 is an insufficient power condition at which the data storage system 1 has insufficient power.

In an embodiment, the control module 16 expresses the power condition in a two bits signal. When all power supply modules 12 are in normal operation, the two bits signal can be shown by (1,1). When one of the power supply modules 12 fails, the two bits signal can be shown by (1,0) or (0,1). When at least two of the power supply modules 12 fail, the two bits signal can be shown by (0,0). When under the condition of the two bits signal showing (1,1), (1,0), or (0,1), the storage server 10 can be in normal operation, but when under the condition of the two bits signal showing (0,0), the storage server 10 cannot be in normal operation due to insufficient power.

Figure 2:
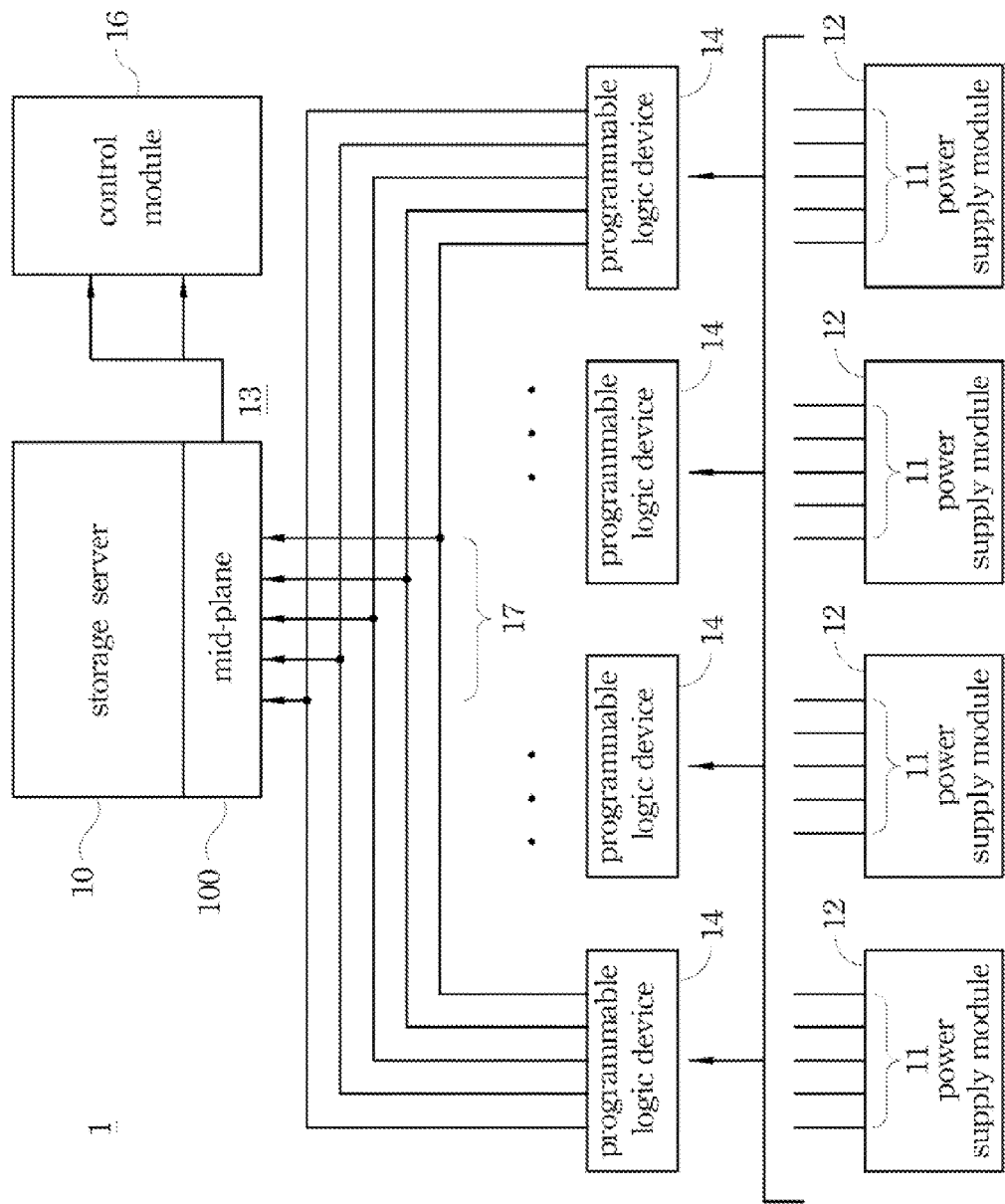
FIG. 2 is a block diagram showing the data storage system with four power supply modules and four programmable logic devices according to an embodiment of the present disclosure.

Referring to FIG. 2, FIG. 2 is a block diagram showing the data storage system 1 with four power supply modules 12 and four programmable logic devices 14 according to an embodiment of the present disclosure.

If the storage server 10 of the present embodiment consumes 3000 watts of power, in the case where the system has four power supply modules 12, the maximum power output of each of the power supply modules 12 is 3000/3 watts (that is 1000 watts). Therefore, when the four power supply modules 12 are in a normal operating state, the four power supply modules 12 respectively provide 750 watts of power to provide power of which the total amount is equal to 3000 watts to the storage server 10. Under this condition, only 250 watts of power are not used for each of the power supply modules 12, and thus there are total 1000 watts of power not be used. However, under the situation of only using two power supply modules 12, 3000 watts of power are wasted. Therefore, the present embodiment saves 2000 watts of power relatively.

When one of the power supply modules 12 fails, the other three power supply modules respectively provide 1000 watts of power to provide power of which the total amount is equal to 3000 watts to the storage server 10. When at least two of the four power supply modules 12 fail, because the rest of the power supply modules 12 cannot afford the power consumption of the storage server 10, the control module 16 determines that the power health condition of the data storage system is an insufficient power condition at which the has insufficient power.

Referring to table 1, table 1 shows the power condition of an embodiment using four power supply modules, wherein the "backup" field is used for showing if there is an available power supply module. The fields "bit 1" and "bit 2" are used to show the content of the signal showing the power condition.

TABLE 1

| Backup | Bit1 | Bit2 | Power1 | Power2 | Power3 | Power4 |
|--------|------|------|--------|--------|--------|--------|
| Yes    | 1    | 1    | OK     | OK     | OK     | OK     |
| NO     | 1    | 0    | OK     | OK     | OK     | Fail   |
| NO     | 1    | 0    | OK     | OK     | Fail   | OK     |
| NO     | 0    | 0    | OK     | OK     | Fail   | Fail   |

It is noted that the above table does not show all possible situations except for the situations that none, one, or two of the power supply modules fail.

According to table 1, it is understood that when at least two power supply modules fail, the control module 16 determines that the power condition of the storage server 10 is an insufficient power condition.

In another embodiment, if the number of the power supply modules is three (not shown) and the storage server 10 consumes 3000 watts of power, the maximum power output of each of the power supply modules 12 is 3000/2 watts (that is 1500 watts). Therefore, when the three power supply modules 12 are in normal operation state, the three power supply modules 12 respectively provide 1000 watts of power to provide power of which the total amount is equal to 3000 watts to the storage server 10. At this time, only 500 watts of power are not used for each of the power supply modules 12, and thus there are total 1500 watts of power not be used. However, when only two power supply modules 12 are used, 3000 watts of power are wasted. Therefore, the present embodiment saves 1500 watts of power relatively. According to the above description, it is understood that if the number of backup power supply modules is increased, more power can be saved.

It is noted that the number of the power supply modules and the number of the programmable logic devices are not limited by the above embodiments, and can be adjusted according to actual applications.

According to the above embodiments, it is understood that the data storage system 1 of the present disclosure uses the programmable logic devices 14 to convert the power-related signals 11 to enable the power-related signals 11 to comply with the data storage server 10 supporting the SBB standard, so that the number of power supply modules can be expanded to save the unused power. In addition, the use of the power supply modules 12 having smaller power results in better performance on heat dissipation and decreases the cost for setting up additional fans or other heat dissipation devices used to dissipate the power supply modules having greater power.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A data storage system with power backup mechanism, comprising:

N power supply modules, wherein each of the N power supply modules generates a presence signal, a warning signal and a state signal, and N is an integer greater than 1;

N programmable logic devices, wherein each of the N programmable logic devices is connected to the N power supply modules and configured to receive N presence signals, N warning signals and N state signals generated from the N power supply modules respectively, each of the N programmable logic devices configured to convert N presence signals, N warning signals and N state signals into a converted first presence signal, a converted second presence signal, a converted first warning signal, a converted second warning signal and a converted state signal;

a storage server connected to the N programmable logic devices and configured to receive N converted first presence signals, N converted second presence signals, N converted first warning signals, N converted second warning signals and N converted state signals from the N programmable logic devices respectively, wherein the storage server is configured to output two power condition signals according to N converted first presence signals, N converted second presence signals, N converted first warning signals, N converted second warning signals and N converted state signals; and a control module connected to the storage server and configured to monitor a power condition of the N power supply modules according to the power condition signals.

2. The data storage system of claim 1, wherein the storage server consumes M units of power during operation, and a maximum power output of each of the N power supply modules is equal to M/(N−1) units of power.

3. The data storage system of claim 2, wherein each of the N power supply modules provides M/N units of power during normal operation.

4. The data storage system of claim 2, wherein when one of the N power supply modules fails, the rest of the power supply modules provide M/(N−1) units of power respectively.

5. The data storage system of claim 1, wherein the control module determines that the power of the data storage system is insufficient when at least two of the N power supply modules fail.

6. The data storage system of claim 1, wherein the control module expresses the power condition as a two-bits signal.

7. The data storage system of claim 1, wherein N converted first presence signal, N converted second presence signal, N converted first warning signal, N converted second warning signal and N converted state signal output by the programmable logic devices are output in a type of open-drain.

8. The data storage system of claim 1, wherein each of the programmable logic devices is a complex programmable logic device.

9. The data storage system of claim 1, wherein the storage server further comprises a mid-plane used to be a medium for communication and data transmission between the N programmable logic devices and the control module and configured to convert the first presence signals, the second presence signals, the first warning signals, the second warning signals and the output state signals into the power condition signals.

10. The data storage system with power backup mechanism, comprising:

N power supply modules, wherein each of the N power supply modules generates a set of power-related signals comprising a presence signal, a warning signal and a state signal, and N is an integer greater than 1;

N programmable logic devices, wherein each of the N programmable logic devices is connected to the N power supply modules and configured to receive the presence signals, the warning signals and the state signals generated from the N power supply modules respectively, each of the N programmable logic devices configured to convert the presence signals, the warning signals and the state signals into a first presence signal, a second presence signal, a first warning signal, a second warning signal and an output state signal;

a storage server connected to the N programmable logic devices and configured to receive the first presence signals, the second presence signals, the first warning signals, the second warning signals and the output state signals from the N programmable logic devices respectively, wherein the storage server further comprises a mid-plane configured to output power condition signals according to the first presence signals, the second presence signals, the first warning signals, the second warning signals and the output state signals, and each of the N power supply modules is configured to generate power for the storage server; and a control module connected to the mid-plane of the storage server and configured to monitor a power condition of the N power supply modules according to the power condition signals.

* * * * *